| United States Patent [19] | [11] Patent Number: 4,532,284 |
| Ogoe | [45] Date of Patent: Jul. 30, 1985 |

[54] CARBONATE POLYMER COMPOSITION

[75] Inventor: Samuel A. Ogoe, Angleton, Tex.

[73] Assignee: The Dow Chemical Company, Midland, Mich.

[21] Appl. No.: 628,545

[22] Filed: Jul. 6, 1984

Related U.S. Application Data

[63] Continuation-in-part of Ser. No. 506,741, Jun. 22, 1983, abandoned.

[51] Int. Cl.$^3$ ............................................. C08K 5/43
[52] U.S. Cl. ................................... 524/169; 524/423
[58] Field of Search ............................... 524/169, 423

[56] References Cited

U.S. PATENT DOCUMENTS

| 4,208,489 | 6/1980 | Schmidt et al. | 525/146 |
| 4,233,100 | 9/1980 | Reinert | 524/169 |
| 4,254,015 | 3/1980 | Thomas et al. | 524/423 |
| 4,366,276 | 12/1982 | Freitag et al. | 524/157 |

*Primary Examiner*—Veronica P. Hoke
*Attorney, Agent, or Firm*—B. G. Colley

[57] ABSTRACT

Fire retardant carbonate polymer compositions having increased processing stability are disclosed. The use of metal sulfates or metal bisulfates having a pka from 1–5 in the amount from 0.001 to 1.0 percent by weight is effective to reduce molecular weight changes during melt shearing. The fire retardancy is provided by metal aromatic sulfimides.

7 Claims, No Drawings

CARBONATE POLYMER COMPOSITION

CROSS REFERENCE TO RELATED APPLICATION

This application is a continuation-in-part of Ser. No. 506,741 filed June 22, 1983 now abandoned.

BACKGROUND OF THE INVENTION

This invention relates to carbonate polymer compositions containing an additive which acts as a flame retardant together with an additive which improves processing stability.

It is known from U.S. Pat. No. 4,201,382 that various metalic salts can be used as fillers for polycarbonate compositions. However, these salts are used in substantial amounts as fillers and do not have the requisite pka value to be useful in this invention.

Carbonate polymers derived from reactions of dihydroxyorganic compounds, particularly the dihydric phenols, and carbonic acid derivatives such as phosgene, have found extensive commercial application because of their excellent physical properties. These thermoplastic polymers are suitable for the manufacture of molded parts wherein impact strength, rigidity, toughness, heat resistance, and excellent electrical properties are required.

Unfortunately, however, these polymers exhibit a brief but definite burning time when contacted with an open flame. More importantly, as is often the case, the carbonate polymers contain stabilizers and other additives which are often more combustible than the unmodified carbonate polymer. As a result, the modified carbonate polymers frequently exhibit substantially poorer resistance to combustion than does the unmodified carbonate polymer.

In attempts to increase the combustion resistance of carbonate polymers including the modified forms thereof, it has been a common practice to employ monomeric phosphites, phosphoric acid esters, thiophosphoric acid esters containing halogenated alkyl radicals and halogenated organic compounds into the carbonate polymer. However, in order to obtain any noticeable improvement in combustion resistance, these additives have been employed in such large quantities that they often adversely affect many of the desirable physical and mechanical properties of the carbonate polymer.

The use of aromatic sulfimides as flame retardants in carbonate polymers is suggested in U.S. Pat. No. 4,254,015 dated 3-3-81. However, it was found that while these additives are efficient as flame retardants they also adversely effect the processing stability of the carbonate polymers. In other words, during melt processing such as extruding into pellets there is a considerable lowering of the molecular weight.

The use of metal salts of inorganic acids such as sodium bisulfate as flame retardants is suggested in Ser. No. 471,597, filed Mar. 3, 1983 now U.S. Pat. No. 4,486,560. However, this application does not suggest the use of these compounds as processing aids.

SUMMARY OF THE INVENTION

The present invention is a carbonate polymer composition comprising a carbonate polymer having dispersed therein, a fire retardant additive comprising a metal salt of an aromatic sulfimide and a metal sulfate or bisulfate having a pka from 1 to 5 inclusive whereby the sulfimide is used in an amount to provide improved flame retardancy and the amount of the sulfate or bisulfate is used to provide increased processing stability. Hereinafter, such compositions will be referred to as fire retardant carbonate polymer compositions and they exhibit surprisingly high resistance to combustion. In addition, said compositions exhibit physical properties comparable to a carbonate polymer containing no fire retardant additive.

The fire retardant carbonate polymer compositions of the present invention are suitably employed in most applications in which opaque polycarbonates have been previously utilized. Applications of particular interest for the utilization of the said carbonate polymer compositions of this invention are pigmented and/or colored carbonate polymers useful as: automobile parts, e.g., air filters, fan housings, exterior components, housings for electrical motors, appliances, business and office equipment, photographic equipment, and aircraft applications.

DETAILED DESCRIPTION OF THE EMBODIMENTS

The carbonate polymers employed in the present invention are advantageously aromatic carbonate polymers such as trityl diol carbonates described in U.S. Pat. Nos. 3,036,036, 3,036,037, 3,036,038 and 3,036,039, polycarbonates of bis(ar-hydroxyphenyl)-alkylidenes (often called bisphenol-A type diols) including their aromatically and aliphatically substituted derivatives such as disclosed in U.S. Pat. Nos. 2,999,835, 3,038,365 and 3,334,154, and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121, 4,287,787, 4,156,069, 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The salt form of aromatic sulfimides which are employed herein are advantageously represented by the formula:

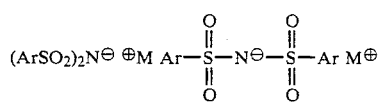

wherein Ar is an aromatic or substituted aromatic group, M is a suitable cation such as a metal cation. M is preferably an alkali metal such as sodium or potassium. Alternatively, M is a divalent cation, preferably alkaline earth or multivalent cation obtained from copper, aluminum, antimony, and the like. Representative preferred sulfimide salts include the alkali metal salts of saccharin, N-(p-tolylsulfonyl)-p-toluenesulfimide, N-(N'-benzylaminocarbonyl)sulfanilimide, N-(phenylcarboxyl)-sulfanilimide, N-(2-pyrimidinyl)sulfanilimide, N-(2-thiazolyl)sulfanilimide and other salts of the sulfimides disclosed in U.S. Pat. No. 4,254,015, which is incorporated herein by reference. Combinations of the the above-identified salts can also be employed.

Useful processing additives are metal bisulfates or sulfates having a pka from 1 to 5 and preferably 1 to 3. Examples of useful metal bisulfates or sulfates are sodium bisulfate, potassium bisulfate, lithium bisulfate, rubidium bisulfate, cesium bisulfate, and aluminum sulfate.

The fire retardant carbonate polymer compositions of the present invention are suitably prepared by combining the carbonate polymer with an effective amount of the fire retardant additive and the processing additive using any of a variety of blending procedures conventionally employed for incorporating additives into carbonate polymer resins. For example, dry particulates of the carbonate polymer and the additives can be dry blended and the resulting dry blend extruded into the desired shape. By "effective amount" is meant that combination of the desired additive components is sufficient to provide improved fire retardant character and processing stability to the carbonate polymer with which it is blended.

While any amount of the fire retardant additive that imparts to the carbonate polymer an improved fire retardancy is suitable, preferred amounts of the fire retardant additive are in the range from about 0.001 to about 10 percent, especially from about 0.005 to about 2 weight percent based on the weight of the carbonate polymer.

The amount of the metal sulfate or bisulfate used to provide increased processing stability can be any amount that is suitable. Preferably, an amount from about 0.001 to about 1.0 weight percent based on the carbonate polymer will be suitable. The most preferred range is from about 0.1 to about 0.1% percent by weight.

In addition to the aforementioned fire retardant additives, other additives can be included in the carbonate polymer composition of the present invention such as fillers (i.e., a tetrafluoroethylene polymer or glass fibers), pigments, dyes, antioxidants, heat stabilizers, ultraviolet light absorbers, mold release agents and other additives commonly employed in carbonate polymer compositions.

The following examples are given to further illustrate the invention and should not be construed as limiting its scope. In the following examples, all parts and percentages are by weight unless otherwise indicated.

EXAMPLE 1

A polycarbonate formulation containing 0.03% and 0.02% by weight of potassium paratolylsulfimide (KpTSM) and potassium bisulfate (KHSO$_4$) respectively is prepared by mixing a Bis A polycarbonate resin having a molecular weight of about 31,000 with the additives for about 45 minutes on a Hobart mixer. The formulated sample is dried for 3 hours at 125° C. (257° F.). The dried sample is extruded to pellets at 329° C. (625° F.). The extruded pellets are redried in a forced draft oven for 3 hours at 125° C. (257° F.). A portion of the dried sample is subjected to melt shearing at 282° C. (540° F.) by torque rheometer over a 30 minute time period (see Table I). The remainder of the sample is injection molded at 302° C. (575° F.) into bars for flammability tests (see Table II).

Modified flammability polycarbonate without potassium bisulfate as well as heat stabilized polycarbonate are similarly prepared and evaluated as controls. All the controls and the examples contained 0.1% by weight of a diphosphonite stabilizer "P-EPQ" from Sandoz (U.S. Pat. No. 3,825,629) and 0.05% by weight of a hindered phenolic stabilizer "Irganox 1076" from Geigy Chemical Corporation (U.S. Pat. No. 3,330,859).

Molecular weight by size exclusion chromatography is measured and compared to the original sample. By this test, it can be deduced that the greater the drop in molecular weight, the less stable the polymer to high temperature melt processing. See the following tables:

TABLE I

| Sample | Torque, Meter-Grams | | |
|---|---|---|---|
| | Initial | Final | Torque Change |
| Control 1 (Heat stabilized Polymer) | 625 | 510 | 115 |
| Control 2 (Control 1 with 0.03% KpTSM) | 590 | 365 | 225 |
| Example 1 (Control 1 with 0.03% KpTSM/0.02% KHSO$_4$) | 560 | 470 | 90 |

TABLE II

| Sample | Molecular Weight ($\overline{M_w}$) | | |
|---|---|---|---|
| | Initial | Final | $\overline{M_w}$ Change |
| Control 1 | 31200 | 28700 | 2500 |
| Control 2 | 29600 | 24400 | 5200 |
| Example 1 | 29700 | 27000 | 2700 |

Table II shows that modified flammability polycarbonate with 0.02% KHSO$_4$ has significantly improved melt processing stability over the sample without KHSO$_4$ (2). Table I shows decreased torque change when the sample with KHSO$_4$ is subjected to melt shearing at 282° C. by torque rheometer for 30 minutes.

TABLE III

| Sample | Flammability Tests | |
|---|---|---|
| | UL-94 | % L.O.I. |
| Control 1 | V-2 | 30.5 |
| Control 2 | V-0 | 41.0 |
| Example 1 | V-0 | 40.0 |

The UL-94 and Limiting Oxygen Index (L.O.I.) tests in Table III show no significant change between the sample with KHSO$_4$ and the one without KHSO$_4$.

EXAMPLE 2

Procedure in Example 1 was repeated except that 0.06% KPTSM and 0.04% KHSO$_4$ buffer were incorporated. The results are as follows:

TABLE IV

| Sample | Molecular Weight (Mw) | | |
|---|---|---|---|
| | Initial | Final | Mw Change |
| Control 1 (Heat Stabilized polymer) | 27400 | 25200 | 2200 |
| Control 3 | 28000 | 23000 | 5000 |

TABLE IV-continued

| | Molecular Weight (Mw) | | |
|---|---|---|---|
| Sample | Initial | Final | Mw Change |
| (Control 1 with 0.06% KPTSM) | | | |
| Example 2 (Control 1 with 0.06% KPTSM/ 0.04% KHSO$_4$) | 27300 | 25200 | 2100 |

TABLE V

| | Torque, Meter-Grams | | |
|---|---|---|---|
| Sample | Initial | Final | Torque Change |
| Control 1 | 640 | 545 | 95 |
| Control 3 | 440 | 260 | 180 |
| Example 2 | 460 | 390 | 70 |

Tables II and IV show that increasing the concentrations of both KPTSM and KHSO$_4$ do not have any adverse effect on the processing stability of the polymer. Similarly, Tables I and V do not show significant torque change regardless of the difference in KPTSM/KHSO$_4$ levels.

TABLE VI

| | Flammability Tests | |
|---|---|---|
| Sample | UL-94 | % LOI |
| Control 1 | V-2 | 29.5 |
| Control 3 | V-0 | 41.0 |
| Example 2 | V-0 | 40.0 |

Table VI indicates that using higher levels of KHSO$_4$ buffer do not significantly affect the modified flammability properties of the polycarbonate.

EXAMPLES 3 AND 4

The procedure of Example 1 was repeated except that 0.06% KPTSM, 0.05% KHSO$_4$ and 0.05% Al$_2$(SO$_4$)$_3$ were incorporated.

The results are shown in Tables VI-VIII.

TABLE VI

| | Molecular Weight (Mw) | | |
|---|---|---|---|
| Sample | Initial | Final | Mw Change |
| Control 1 (Heat stabilized polymer) | 27400 | 25200 | 2200 |
| Control 3 (Control 1 with 0.06% KPTSM) | 28000 | 23000 | 5000 |
| Example 3 (Control 1 with 0.06% KPTSM/0.05% KHSO$_4$) | 27300 | 25300 | 2000 |
| Example 4 (Control 1 with 0.06% KPTSM/0.05% Al$_2$(SO$_4$)$_3$) | 27700 | 25700 | 2000 |

TABLE VII

| | Torque, Meter-Grams | | |
|---|---|---|---|
| Sample | Initial | Final | Torque Change |
| Control 1 | 640 | 545 | 95 |
| Control 3 | 440 | 260 | 180 |
| Example 3 | 460 | 400 | 60 |
| Example 4 | 450 | 410 | 40 |

TABLE VIII

| | Flammability Tests | |
|---|---|---|
| Sample | UL-94 | % LOI |
| Control 1 | V-2 | 30.5 |
| Control 3 | V-0 | 40.0 |
| Example 3 | V-0 | 40.0 |
| Example 4 | V-0 | 40.0 |

We claim:

1. A flame retardant polymer composition comprising a carbonate polymer having dispersed therein a metal salt of an aromatic sulfimide and a metal sulfate or bisulfate having a pka from 1 to 5 inclusive whereby said sulfimide is used in an amount from 0.001 to about 10 weight percent to provide improved flame retardancy and the amount of said sulfate or bisulfate used is from 0.001 to 1.0 weight percent to provide increased processing stability all percentages being based on the weight of the carbonate polymer.

2. A composition of claim 1 wherein said metal salt of an aromatic sulfimide is represented by the formula:

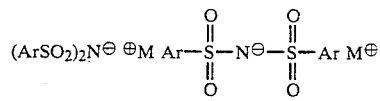

wherein Ar is an aromatic or substituted aromatic group, M is a metal cation.

3. The composition of claim 2 wherein M is a metal cation selected from the group consisting of sodium, potassium, lithium, rubidium, cesium, calcium, magnesium, strontium, copper, aluminum and antimony.

4. The composition of claim 1 wherein said metal sulfate or bisulfate is selected from the group consisting of sodium bisulfate, potassium bisulfate, lithium bisulfate, rubidium bisulfate, cesium bisulfate, and aluminum sulfate.

5. The composition of claim 1 wherein said sulfimide is present in an amount from about 0.05 to about 2 weight percent based on the weight of the carbonate polymer.

6. The composition of claim 1 wherein said metal sulfate or bisulfate is present in an amount from about 0.01 to 0.1 weight percent based on the weight of the carbonate polymer.

7. A composition of claim 1 wherein the carbonate polymer is a polycarbonate of bisphenol-A, and said sulfimide comprises the alkali metal salt of N-(p-tolylsulfonyl)-p-toluenesulfimide and said bisulfate or sulfate is a member of the group consisting of an alkali metal bisulfate and aluminum sulfate.

* * * * *

UNITED STATES PATENT AND TRADEMARK OFFICE
CERTIFICATE OF CORRECTION

PATENT NO. : 4,532,284
DATED : July 30, 1985
INVENTOR(S) : Samuel Abotar Ogoe

It is certified that error appears in the above—identified patent and that said Letters Patent is hereby corrected as shown below:

Col. 1, line 14; reads "metalic" should read --metallic--.

Col. 2, line 25; please insert --the-- after "as".

Col. 2, line 60; please insert opening brackets at beginning of formula and closing brackets after the first "m" in formula.

Col. 3, line 8; please delete "the".

Col. 3, line 41; reads "0.1"; should read --0.01--.

Col. 6; please insert open brackets at beginning of formula and close brackets after the first "m".

Signed and Sealed this

Fourth Day of February 1986

[SEAL]

Attest:

DONALD J. QUIGG

Attesting Officer

Commissioner of Patents and Trademarks